(12) United States Patent
Fisher et al.

(10) Patent No.: US 7,720,916 B2
(45) Date of Patent: May 18, 2010

(54) ORDERING PERSONAL INFORMATION USING SOCIAL METADATA

(75) Inventors: Danyel A. Fisher, Seattle, WA (US); Alice Jane Bernheim Brush, Bellevue, WA (US); Andrew W. Jacobs, Seattle, WA (US); Marc A. Smith, Redmond, WA (US); Carman G. Neustaedter, Calgary (CA)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/363,885

(22) Filed: Feb. 28, 2006

(65) Prior Publication Data

US 2007/0203991 A1    Aug. 30, 2007

(51) Int. Cl.
*G06F 15/16* (2006.01)
(52) U.S. Cl. .................... 709/206; 709/217; 704/4
(58) Field of Classification Search .................. 709/206
See application file for complete search history.

(56) References Cited

U.S. PATENT DOCUMENTS

| | | | | |
|---|---|---|---|---|
| 6,493,702 | B1* | 12/2002 | Adar et al. ................. | 707/3 |
| 7,340,481 | B1* | 3/2008 | Baer et al. ............... | 707/104.1 |
| 2002/0138588 | A1* | 9/2002 | Leeds ......................... | 709/217 |
| 2003/0233419 | A1* | 12/2003 | Beringer .................... | 709/206 |
| 2004/0111467 | A1* | 6/2004 | Willis ......................... | 709/203 |
| 2004/0143636 | A1* | 7/2004 | Horvitz et al. ............. | 709/207 |
| 2004/0230572 | A1* | 11/2004 | Omoigui ...................... | 707/3 |
| 2004/0260778 | A1* | 12/2004 | Banister et al. ............. | 709/206 |
| 2007/0143596 | A1* | 6/2007 | Myers et al. ............... | 713/156 |
| 2007/0198677 | A1* | 8/2007 | Ozhan et al. .............. | 709/223 |
| 2008/0098078 | A1* | 4/2008 | Daniell ...................... | 709/206 |
| 2008/0162498 | A1* | 7/2008 | Omoigui ..................... | 707/10 |

OTHER PUBLICATIONS

Neustaedter, wt al. "The Social Network and Relationship Finder: Social Sorting for Email Triage" Microsoft Publications (2005) 8 pages.

Neustaedter, et al. "Beyond "From" and "Received": Exploring the Dynamics of Email Triage" University of Calgary (2005) 4 pages Balter, et al. "Bifrost Inbox Organizer: Giving Users Control Over the Inbox" (2002) Proceedings of Nordic CHI 2002, 8 pages.

(Continued)

*Primary Examiner*—Thu Nguyen
*Assistant Examiner*—Tauqir Hussain
(74) *Attorney, Agent, or Firm*—Lee & Hayes, PLLC (57) ABSTRACT

A unique system, method, and user interface that facilitate ordering personal items based on past personal interaction between a user and the user's correspondents are provided. In particular, the system provides alternative views of information, such as messages, that is organized around people using an ordering based on the history of communication between the recipient and sender. Social metrics can be calculated based on social metadata associated with the messages, for example. Metrics can be used to configure how or which messages are viewed and their order in one or more pane views. Each pane view can present different orderings of messages—which are displayed by the recipient or sender of the message. So for instance, instead of viewing messages in chronological receipt date, they can be viewed by the message's sender and ordered by the number of messages previously sent to the user.

14 Claims, 7 Drawing Sheets

OTHER PUBLICATIONS

Bellotti, et al. "Taking Email to Task: The Design and Evaluation of a Task Management Centered Email Tool" (2003) Proceedings of the ACM Conference of Human Factors in Computing Systems, pp. 345-352.

Dourish, et al. "Presto: an Experimental Architecture for Fluid Interactive Document Spaces" (1999) ACM Transactions on Computer Human Interaction 6(2), pp. 133-161.

Ducheneaut, et al. "E-mail as Habitat: An Exploration of Embedded Personal Information Management" (2001) Interactions 8(5), pp. 30-38.

Dumais, et al. "Stuff I've Seen: A System for Personal Information Retrieval and Re-use" (2003) Proceedings of SIGIR 2003, 7 pages.

Kerr, et al. "Designing Remail: Reinventing the Email Client Through Innovation and Integration" (2004) Proceedings of the ACM Conference on Human Factors in Computing Systems, Design Case Study, pp. 837-852.

Roa, et al. "Exploring Large Tables with the Table Lens" (1995) Proceedings of the ACM Conference on Human Factors in Computing Systems, pp. 403-404.

Venolia, et al. "Understanding Sequence and Reply Relationships within Email Conversations: A Mixed-Model Visualization" (2003) Proceedings of the ACM Conference on Human Factors in Computing Systems, 9 pages.

Whittaker, et al. "Email Overload: Exploring Personal Information Management of Email" (1996) Proceedings of the ACM Conference on Human Factors in Computing Systems, pp. 276-283.

Horvitz, et al. "Attention-Sensitive Alerting" (1999) Proceedings of UAI '99, pp. 305-313T.

Lockerd, et al. "Understanding Implicit Social Context in Electronic Communication" (2002) MIT Master's Thesis, 88 pages.

Cutrell, et al. "Notification, Disruption, and Memory: Effects of Messaging Interruptions on Memory and Performance" (2001) Interact 2001 Conference Proceedings in Tokyo, Japan, 7 pages.

Fiore, et al. "Observed Behavior and Perceived Value of Authors in Usenet Newsgroups: Bridging the Gap" (2002) Proceedings of the CHI 2002 Conference on Human Factors in Computing Systems, 8 pages.

Fisher, et al. "Social and Temporal Structures in Everyday Collaboration" (2004) CHI 2004, 8 pages.

Nardi, et al. "NetWORKers and their Activity in Intensional Networks" (2002) The Journal of Computer-Supported Cooperative Work 11, pp. 205-242.

Rohall, et al. "Remail: A Reinvented Email Prototype" (2002) Proceedings of the CSCW 2002 Conference on Computer-Supported Cooperative Work, 4 pages.

Takkinen, et al. "Cafe: A Conceptual Model for Managing Information in Electronic Mail" (1999) Proceedings of the Thirty-First Hawaii International Conference on Software Systems, 10 pages.

Venolia, et al. "Supporting Email Workflow" (2001) Microsoft Technical Report TR-2001-88, 8 pages.

GMail by Google http://gmail.google.com last viewed May 2, 2006, 1 page.

Cadiz, et al. "Designing and Deploying and Information Awareness Interface" (2003) Proceedings of the ACM Conference of Computer-Supported Cooperative Work, pp. 314-323.

Tyler, et al. "When Can I Expect an Email Response? A STudy of Rhythms in Email Usage" (2003) Proceedings of the European Conference on Computer Supported Sooperative Work, 20 pages.

Allen. "Getting Things Done: The Art of Stress-Free Productivity" Penguin Books: New York, 2001.

* cited by examiner

ORDERING PERSONAL INFORMATION USING SOCIAL METADATA

BACKGROUND

The volume and use of email has changed dramatically over the past decade. For many early users of email, notes and letters between friends could be sent and received rather quickly and without much cost. However, as the computer age has progressed, so too has the purpose of email. Email has become a critical communication medium for many businesses and organizations. As employees, for example, seek to separate more relevant messages from a swath of less relevant messages, they may tend to feel overwhelmed. This is due in large part to the great amounts of messages to read through in often very little time. Despite the changing use of email and the different behaviors of current email users, user interfaces to support email have remained relatively unchanged. Existing email user interfaces do not provide users with an effective means for assessing their email or other information, in general, in terms of importance, priority, or relevance, particularly when users are constrained by time.

Most people spend a considerable portion of time triaging their email. Those who receive large volumes of email are forced to triage their email more frequently and spend more time triaging throughout the day; failure to do so can result in an overwhelming feeling of information overload. While most people can tell the difference between strangers and the people they know well, unfortunately email clients as well as other client applications lack this basic capability. By way of example, most email clients provide only a limited set of tools to help people efficiently assess or handle their email using information such as who it is from, when it was received, and the subject. In particular, such clients are restricted to sorting this information in a fixed manner: ascending or descending (alphabetical or chronological) order. When receiving large volumes of email, this information does little to help users decide which emails are the most important or which should be handled first, especially when there is little time available to make these assessments. The most important emails given one's current context can be easily buried in the inbox and hard to find. This limits the email client's utility for helping users deal with the increasingly challenging task of managing growing volumes of content along with spam and related email fraud problems.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s), methodology, and/or user interface that facilitate ordering information according to a user's past personal behavior. The types of information can include messages, documents, pictures, etc. that can indicate an author or creator of the information. This can be accomplished in part by analyzing the social metadata associated with the information and then determining one or more social metrics based on the metadata. The information is user-specific or "personal" to that user, thus the metrics are also personal to the user. Consider the following scenario: Mike, Colin, and Shane are co-workers but Colin and Shane work in the same group. Colin's information may include such items as documents, messages, photos, programs, music and other files. Social metrics can be calculated for Colin based on his information including any information that is received by or sent from him. Shane may provide Colin with more information than other people in the company; therefore Colin's metrics for Shane may differ from Mike's metrics for Shane. Once the social metrics are determined, they can be selectively employed to order the presentation of Colin's information.

By way of example, ordering a user's information according to user-specific metrics can facilitate the triage of one's messages. Message triage involves the manner in which new, incoming, or unread messages are handled. Contrary to conventional techniques, the system and method provide users with alternative views of their messages (and/or other items) which are organized around people and their personal or social relationships with those people. In particular, messages can be ordered using one or more metrics derived in part from the history of communication between the recipient and the sender.

For messages, a range of social metrics can be calculated by the system and method for every author or correspondent using the social metadata associated with the messages. Correspondents include senders and receivers of messages that are sent to and/or received from a (current) user. Social metadata can include social properties for a user's correspondents and can be used to determine the range of social metrics such as, for example, the number of messages sent from an author in any given time frame, the number of those messages that were replies, and the number of messages that remain unread. Many different metrics can be chosen to sort and display the desired information.

This information can be presented to the user in various views such as a main view, list view, and thread view. The main view can include one or more panes in which each pane presents a subset of available message correspondents (and any associated messages). The order of the correspondents depends on the user's selected metrics. Different visualization cues such as color, size, and transparency can be employed as well to emphasize an aspect of a selected metric. For example, if a user wants to view correspondents who have been sent the most messages from the current user at the top of the list (e.g., highest to lowest), then the correspondents at the top of the list can appear in a dark shade of a color and fade into lighter shades of the same color further down the list. Alternatively, multiple colors can be employed. The same may be done with respect to the character font. Names at the top may appear in a larger font and progressively get smaller further down the list—or vice versa—depending on the metrics selected by the user. Moreover, each pane includes a display of selected information sorted by correspondents according to their frequency of communication with the current user. For example, the user may wish to view unread messages sent only to me since yesterday (e.g., display criteria) sorted by "highest to lowest" correspondents who have received "messages from me in the last 7 days".

The list and thread views facilitate viewing messages from a particular correspondent. The user can select a correspondent included in one pane and the system and/or method can choose the most appropriate view. If there is only one message associated with the correspondent, then the message can be opened in the user's messaging system. However, when multiple messages are present, then the list view may be chosen. In this view, the user can see the relevant messages associated with that correspondent according to the display criteria. Related thread messages can be included in this view as well as deleted messages if desired by the user. In addition, the list view can be filtered and refreshed. When multiple messages exist for a given correspondent, these messages may be presented in the thread view when they are all part of the same conversation or message chain.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

In addition, it should be noted that the term "correspondents" as used herein can refer to either or both senders and/or receivers of messages depending on the context of such usage. For instance, in the context of "a correspondent and a current user", the correspondent may be the sender of a message to the user or the recipient of a message from the user.

Figure 1:
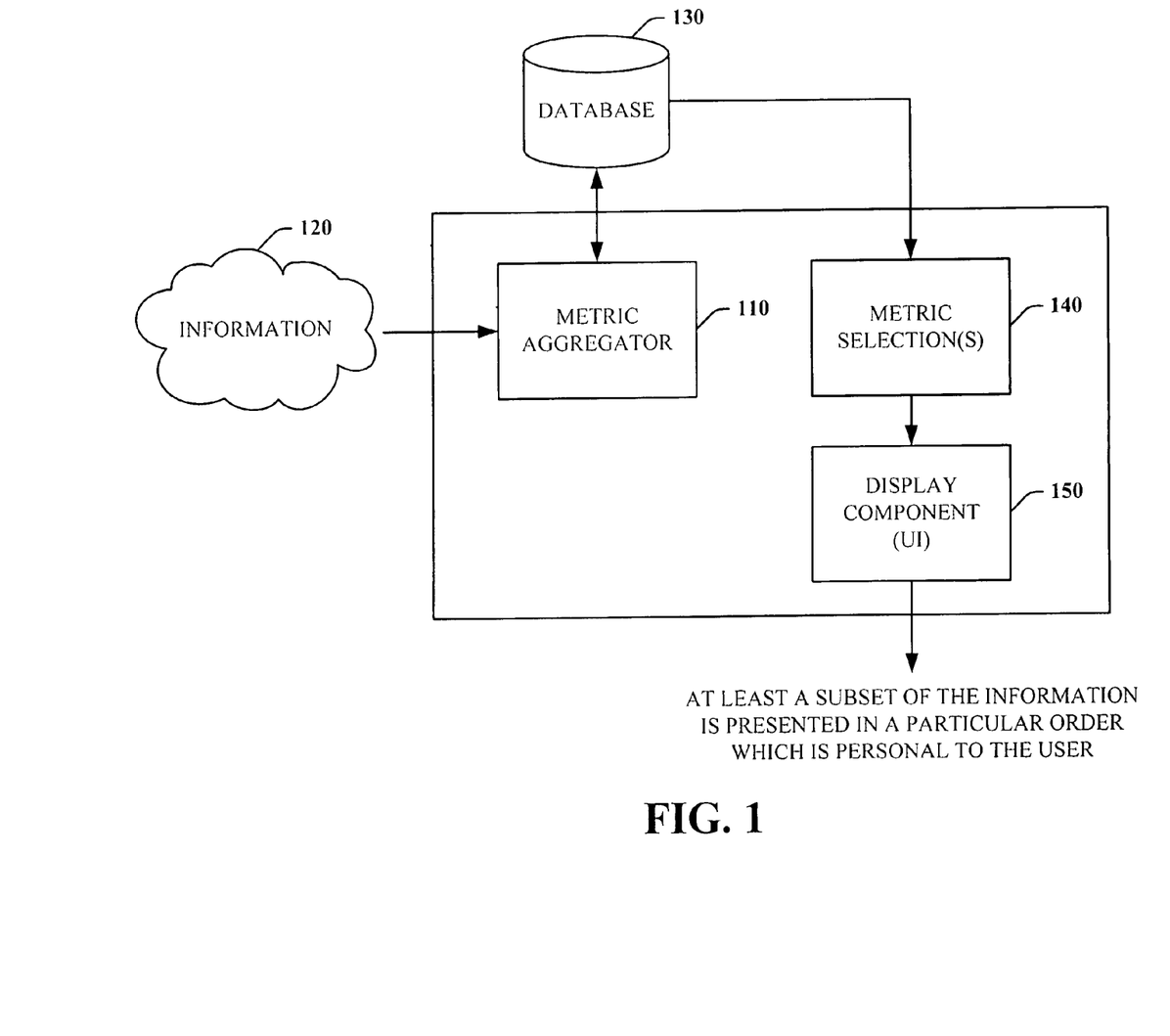
FIG. 1 is a block diagram of a system that facilitates ordering personal items based in part on social metadata.

Referring now to FIG. 1, there is a general block diagram of a system 100 that facilitates ordering information based in part on the social metadata associated with such information. The system 100 includes a metric aggregator 110 that can determine and aggregate one or more social metrics. The social metrics can be derived or calculated from analyzing the social metadata associated with a user's existing or stored information 120. Metrics can be created for each person the user interacts or otherwise communicates with. Thus, past personal behavior can be employed to create the metrics. For example, Robert and John both interact with George, albeit in non-identical ways and/or with different frequency. On their respective computing devices, John and Robert would like to order the presentation of their information—including any information involving George. Because the determination of metric values are user-specific, Robert's metrics for George may and most likely will differ from John's metrics for George since Robert and John's interactions with George are not identical and are independent of each other. This contrasts with conventional ordering schemes that typically analyze or learn from group behavior or group interactions.

Once the social metrics are created for the user, they can be selectively applied to the user's information (e.g., metric selections 140). The user can apply the selected metrics to one or more types of information as desired and the affected information can be ordered and presented to the user accordingly by a display component 150.

In practice, suppose a user wants to read new email in order of importance. She can activate the system 100 to operate in tandem with her messaging system or client. New email can be processed by way of the messaging client and presented to the user in a customized order via the system 100. For example, when a new message arrives, the messaging client may present it by default in the "Inbox" or may filter it to another designated folder. As this takes place, the system 100 can present the same new message in an order according to the user's relationship with the message sender—and thus, based on the selected metrics. So when a message is opened in an email client, that message may be marked as Read and may be presented differently by the system 100. Alternatively, the user can select to open an unread message from Suzie via the system 100 which can trigger the messaging client to open the message. Some messages can be viewed using the system 100; however the messaging client remains the primary location for creating, sending, storing, and deleting messages.

The metric aggregator 110 determines and aggregates a plurality of social metrics in connection with messages sent to or from Suzie and one or more correspondents (by way of a messaging system 120). Social metrics refer to the quantifiable measurements derived from metadata associated with each message. These measurements can capture multiple dimensions between the current user and their correspondents and among the correspondents themselves. The metric aggregator 110 can collect data such as the number of times the user replied to messages to each, number of messages sent to the user and marked unread (or read), number of messages CC'd to the user or from the user to each person, etc. This data can then be used to calculate and determine the corresponding social metrics. The metric aggregator 110 can aggregate at least two types of metrics for each correspondent: sent metrics and received metrics. See Table 1 below for an exemplary list of both types of metrics:

TABLE 1

Sent and Received Metrics for Each Correspondent

|  |  | Metric Name | Metric Attributes | Social Information Provided by the Metric |
|---|---|---|---|---|
| Sent | 1 | ToFrom | emails sent to each person from the user | who receives the most/least emails from the user |
|  | 2 | ToFromReply | replies to each person from the user | who receives the most/least replies from the user |
|  | 3 | CCFrom | emails CC'd to each person from the user | who is included in the most/least email conversations by the user |
|  | 4 | ToNotFrom | emails sent to each person from others (not the user) | with whom is the user included in conversations (the user appears on the CC line) |
| Received | 5 | FromTo | emails sent to the user from each person | who sends the most/least emails to the user |
|  | 6 | FromToReply | replies sent to the user | who replies the most/least to the user's emails |
|  | 7 | FromToRead | emails sent to the user and marked read | who sends the most/least emails to the user that are read |
|  | 8 | FromToUnread | emails to the user and marked unread | who sends the most/least emails to the user that are not yet read |
|  | 9 | FromCC | emails CC'd to the user | who includes the user in the most/least email conversations |
|  | 10 | FromCCRead | emails CC'd to the user and marked read | who includes the user in the most/least conversations that the user had read |
|  | 11 | FromCCUnread | emails CC'd to the user and marked unread | who includes the user in the most/least conversations that the user has not read |

As demonstrated in Table 1, a labeling scheme can be employed to describe each metric: the first word is the role of the correspondent in the metric, the second word is the role of the user in the metric, and any end words indicate special attributes about the metric. For example, the metric From-ToUnread represents the number of messages From the correspondent, sent To the user, and marked Unread. All the metrics can be collected for each of the user's correspondents and aggregated for a set of time periods such as daily, weekly, monthly, in the last year, and over all of the user's messages. They can be stored in the database 130 which the user can adjust the time frame at which aggregations are updated in order to include new messages.

The display component 150 can present the selected views of messages to the user according to the metrics selected. For example, suppose Suzie selects to display messages marked Read from correspondents and sorted by those who have received replies from the user. When the selections are made, the appropriate data can be accessed from the database 130 and communicated to the display component 150. The user can visualize the "results" on a user interface.

Furthermore, more than one type of message can be tracked for each of the user's correspondents across multiple accounts. That is, imagine that Suzie has several correspondents with whom she communicates with using email, instant messaging, and chat messaging. The system 100 can be applied across multiple accounts and/or message types so that she can maintain a consistent and uniform set of display settings. It should be appreciated that metrics can be created for each type of message or can be applied across all types of messages to meet the various needs of the user.

For discussion purposes, FIGS. 2-7 will be described with respect to ordering messages including email, SMS, chat, and instant messages. These messages may be received by or sent from any computing device including but not limited to a desktop computer, laptop, smart phone, cell phone, PDA as appropriate. However, it should be appreciated and understood that the systems, methods, and user interfaces described herein can be tailored to any item or type of information that can be organized based in part on personal behavior of a user with respect to other people or entities as ascertained by their exchange of information. For example, the presentation of personal desktop search results as well as the search results obtained on a portable or mobile device can be ordered using the systems and methods discussed herein.

Message triage can be referred as the task of sifting through unhandled messages and selecting particular messages to handle before others. Many individuals triage first thing in the morning, or after being away from their messaging client for a period of time. During these triage periods, users often suffer from having more messages than time available. The systems, methods, and user interfaces described below can be employed to assist with these time-critical periods. In fact, in these time-stressed periods, many users choose to employ multi-pass strategies to read their messages, skimming through to select ones that are particularly easy to handle or particularly important. Additional passes to choose the next most important message follow as time permits. Hence, users are often required to make many decisions about which messages are most relevant—which can be a rather tedious task to effectively perform during such periods. Despite the clear inefficiencies of this method, it is a method required for triage by most contemporary message tools, which tend to present messages in order of receipt rather than relevance.

In contrast, the subject application employs social metadata and social sorting to reorganize the display of incoming and/or unread messages. By ranking authors based on their history of interaction with the (current) user, the application supports more effective decisions made in real time about which messages are worth reading at a particular time. Thus, messages from frequent correspondents are brought to the fore, and this allows users to more easily locate more relevant messages especially when pressed for time. As such, it reflects the advantages of a multi-pass strategy without requiring users to repeatedly scan their entire inbox.

In addition, the user interface can also be used after triage periods to provide a peripheral awareness of new messages, highlighting messages from frequent correspondents, and those sent directly to the user. Instead of notifications for all new messages, users can be made passively aware of a select subset of messages as they trickle in during the workday.

Figure 2:
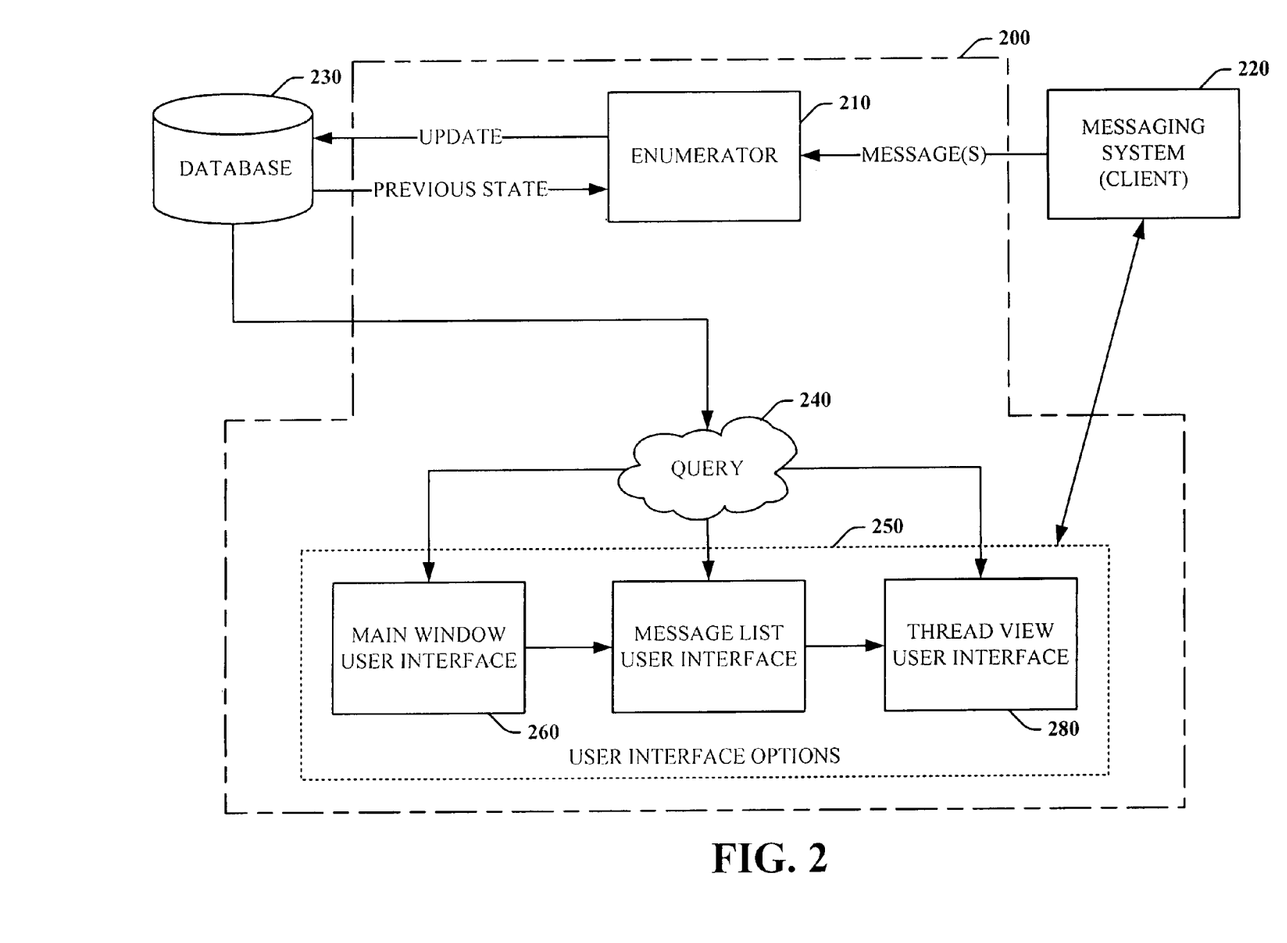
FIG. 2 is a block diagram of a system that facilitates ordering messages based in part on a history of communication between correspondents.

Referring now to FIG. 2, there is a block diagram of a system that facilitates ordering messages based in part on a history of communication between correspondents. The system 200 includes an enumerator 210 that calculates one or more metrics for any messages to or from the correspondents of each user. The enumerator 210 can index messages as they are received by a messaging system 220 and collect the relevant data from each message for storage in a database 230. As messages are opened and/or marked "read", the state of the message can be updated in the database 230. When a query 240 is submitted, the appropriate data can be accessed from the database and then viewed by way of at least one user interface 250 such as a main window user interface 260. The messaging system 220 and the user interfaces 250 can communicate with each other as messages arrive to the messaging system 220 or are opened either in the messaging system 220 or viewed in a thread view (280) so that the user interface 250 accurately presents the order of correspondents according to the selected metrics as well as any pertinent messages related to them.

As mentioned earlier, the social accounting metrics that the system (100, 200) aggregates can provide resources for social sorting: the re-ranking of collections of messages based on attributes like "the number of times that this person has replied to me and I have read their message" or "the number of messages I send to this person that are replies." These sorting metrics allow for more effective message triage by sorting messages to the top of lists (at least one) based on the nature and strength of the relationship between the user and each correspondent present in their message(s). For example, a common user challenge is returning to a large collection of messages after being away for some time. Often faced with limited time for triage, users are forced to scan, select, and often initially move or delete camouflaging content that obscures the "good" messages. For this reason, the system can visualize the person-centric social metadata that it aggregates. To further illustrate the operation of the system, several scenarios that follow below demonstrate a variety of social metrics and sorting features that can support message triage.

For example, imagine that a user has messages from socially important people and would like to bring such messages to the forefront in order to be made aware of their messages more quickly than others. Social importance can be determined in many different ways using different metrics such as any of the following:

the number of messages a user sends to a person (correspondent);

the number of times the user replies to a person's messages;

the number of messages that the user receives from a person that get marked read; or the number of times a person replies to the user's messages.

All of these metrics can indicate social relationships. Under the system (100, 200), users can sort correspondents by at least one of these social relationship indicators and use a secondary metric to display, for instance, the number of unread messages from each person. When more than one metric is selected to determine a sort order of the correspondents, the data corresponding to each metric can be weighed equally to obtain a single value or the selected metrics can be weighed differently based on their "meaning" or worth to the user. In particular, a user may want to include 2 metrics such as the number of replies the user sent to the person in the last 7 days and the number of replies received from the person (to the user's messages) in the last 30 days. Default weights can be assigned to the metrics by assigning different priorities or levels of importance to each one. In the alternative, the user can assign specific weights to each one (e.g., that total 100%).

To further demonstrate viewing messages by the social importance of people, suppose the following list of correspondents is presented to the user assuming the first metric corresponds to the number of messages sent from the user to the each person (e.g., ToFrom) and the second metric corresponds to the number of unread messages from the person to the user (e.g., number in parentheses):

Spouse (3)
Sibling (1)
Team colleague (5)
. . .
Distributed Mailing list (24)

According to the list order, the user's correspondents named Spouse and Sibling are high on the list and thus have an important relationship with the user because the user takes time to send them the most messages. Messages from these correspondents easily stand out with the current sort criteria; therefore it is relatively easy to find unread messages from socially important people. If one were to sort only by the number of unread messages from each person, messages from the most important people would not stand out. Rather, messages from the mailing list with whom the user rarely if ever corresponds would appear at the top of the list.

Imagine now that the user wants to sort messages from people of recent importance by bringing the relevant people to the top of the list. Social importance is not static. Rather, it changes over time given one's social context (e.g., work projects, social events, etc.). Thus, it is often desirable to easily find messages relating to current projects or upcoming meetings. For example, the same sorting metric from the first scenario—the number of messages sent by the user to a person (ToFrom)—could be used but only considering a recent time period, say the last month. The selection of a current time period will bring people of recent importance to the top. A second metric, like the previous scenario, could show the number of unread messages from each person (FromToUnread). Often people exchange a series of messages several days before an upcoming meeting. If a user needed to quickly triage her messages for new messages of this type, she could perform the previous sort but for the current week.

The previous scenario may be related to messages containing emerging topics. Emerging topics typically refer to a larger than usual number of messages from a particular entity (person or group) and often signal an issue or problem. In customizing a pane in the user interface, the first metric can be used to produce a relationship indicator similar to the previous scenarios. The second metric could show the difference in the amount of messages received from people between yesterday and today. Large changes may indicate an emerging discussion or problem topic. If people were sorted by the relationship indicator metric, it would be easy to spot large changes in the amount of message since yesterday for those correspondents with strong social relationships to the user. On the other hand, if people were sorted by the change in the number of messages received, people involved in hot topics would rise to the top of the list even if they were not people with strong relationships to the user.

In various personal or work-related settings, social imbalances can occur where some people receive more messages from a person than they send to the person. To readily determine whether this has occurred with any of a user's correspondents, the user can sort people according to the difference in number of messages sent from each person (e.g., FromTo) and the number of messages sent to each person (ToFrom) for a current time period. This will bring the people who have sent more messages to the user than they have received from the user to the top of the list.

Figure 3:
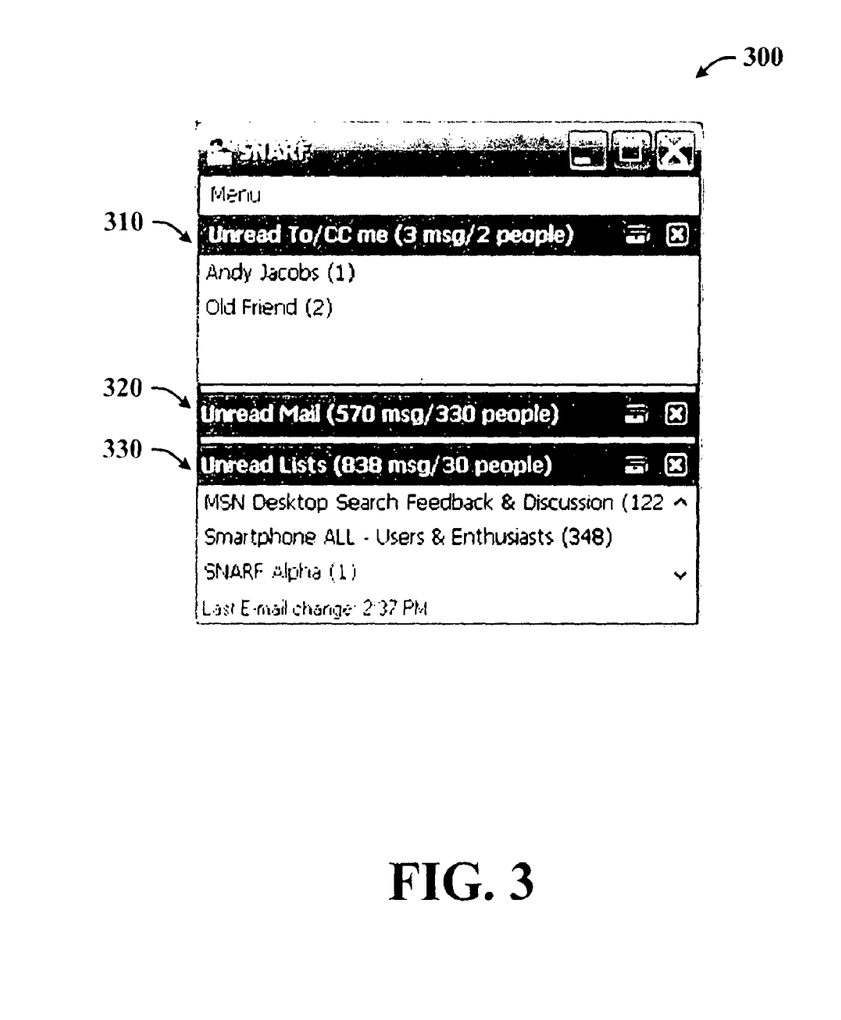
FIG. 3 is an exemplary user interface for the system of FIG. 2 that demonstrates a main view of one or more panes which facilitate triaging messages.

Turning now to FIG. 3, there is an exemplary user interface 300 for the system of FIG. 2 that demonstrates a main view configuration of the system (100, 200). In this view, one or more panes can be customized per user to facilitate triaging messages. In this particular screen shot, the top pane 310 entitled Unread To/CC me, shows correspondents whose messages that have explicitly included the user in the To or CC line, and remain unread. The middle pane 320, Unread Mail, shows all correspondents with unread messages that the user received (and thus may have gotten as a BCC or through a mailing list). The bottom pane 330, Unread Lists shows all correspondents identified or marked as a list from which the user has received messages in the last week—which currently remain unread. It is worth noting that the panes are not mutually exclusive; a particular message or person may appear in multiple panes if they match the criteria.

Visual indicators such as highlights can be provided as cues that convey the relative amount of messages from the correspondent within a view. In addition, there can be two types of views. Personal views filter for messages that explicitly mention the user, such as Unread To/CC me. Aggregate views show collections of messages that may not mention the user such as all unread messages sent to lists (Unread lists). Personal views generally contain shorter lists of people with fewer messages each; the latter type generally contains more people and more messages.

Moreover, there are two processes in action here: selection and sorting. First, correspondents are selected for inclusion into a view by the how they addressed the message they sent (either directly or via a list). Second, correspondents are sorted by the number of times that they have interacted with the user in the (configurable) past period. By default, the list of correspondents can be ordered by the number of messages that the user has sent to this correspondent. Thus, frequent and recent correspondents rise to the top, while infrequent correspondents sink to the bottom. For example, according to FIG. 3, the user has sent more messages to Andy Jacobs than Old Friend; therefore Andy Jacobs is sorted higher on the display than Old Friend. Users are able to configure the selection and sorting of these views or add additional views. Additional configuration options are available on this display for each pane (e.g., FIG. 4, infra).

The ability to view and customize multiple panes or views of correspondents and their message count reflects the difference between the relevance of a particular sender and a sender's message. Andy Jacobs may be very important to me, but messages from Andy Jacobs sent only to me are often qualitatively different from messages sent by Andy Jacobs to a mailing list we both subscribe to.

Each pane view responds in real time to changes in a message state. For example, if a message from a sender to the user is marked as read, the "Unread Messages" view is updated; hence, it will no longer show that sender if no more unread messages remain. When the user double-clicks on an entry showing just one message, the message can be opened in the user's messaging client. If the name is associated with more than one message (e.g., there is more than one unread message from that person), then the system can present a list of these messages in a second window (e.g., FIG. 5, infra).

Figure 4:
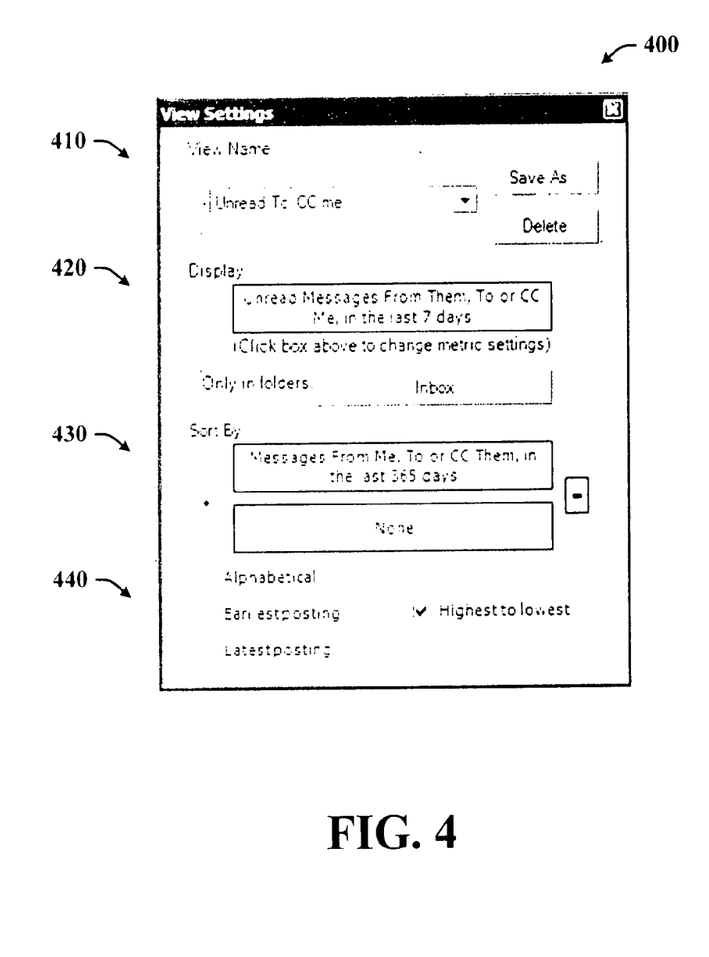
FIG. 4 is an exemplary user interface that allows one or more panes (as shown in FIG. 3) to be customized according to the needs and preferences of a user to facilitate the triage of the user's messages.

To define or configure the information displayed in a particular pane view, an exemplary user interface 400 such as the one shown in FIG. 4 can be employed. This screen may be referred to as the View Settings screen for discussion purposes. The View Settings user interface 400 lets the user customize what is displayed in a pane, and to save those options as a view. Any changes made in this window can immediately affect the associated pane, so the user can quickly and easily see the affects of their change. However, the changes will not be made permanent until they are saved as a View.

To select an existing view name 410, a drop-down list can be accessed to see the available views. New views can be added as well by changing the name of the view and saving the associated settings. In practice, for example, select an existing view from the dropdown list. If all settings are as desired, the View Settings window can be closed by clicking the "close" icon in the upper right corner of the window. Otherwise, any desired settings can be modified. When changes are made to the settings, the word "modified" may appear under the view name to indicate that the changes have not been saved. To save the current settings for future use, the user can click the "Save As" button. This will prompt the user for the name of the view to save the settings under—the current name is the default. If the user keeps the current view name, then the current settings will overwrite any previous settings for that view. Otherwise, the user can type a new name into the box to create a new view name with the current settings. Views can be deleted as well by selecting it and then clicking the "Delete" button.

The Display section 420 selects which messages to include in a count for a person to be displayed. The setting can be changed by clicking in the white box, and selecting an option from the menu that appears. Exemplary options available to the user include:

To Me only—lists people who sent message to the current user, where they were the only listed recipient.
To Me—lists people who sent message where the current user was on the To line.
To or CC Me—lists people who sent message where the current user was on the To or CC line.
To anyone—lists all senders of message, whether the current user's name appears on the To or CC line, or not.
From Me—lists recipients of message sent by the current user.
From anyone—lists recipients of both sent and received message.
To, From or CC Them—lists senders and recipients.
Day—includes message received over the last full day (e.g., yesterday) and today.
7 days—includes message received over the last week.
30 days—includes message received over the last month.
365 days—includes message received over the last year.
All—includes all message, regardless of when it was sent.
Replies only—includes only message that Outlook recognizes as a reply (e.g., with "RE:" in the subject).
Unread only—includes only message marked as Unread in Outlook.
Read only—includes only message marked as Read in Outlook.
Lists only—includes only people marked as a List
Non-Lists only—includes only people not marked as a List The list of messages can also be limited to specific message client message folders (e.g., only messages in the Inbox) and all of their subfolders. If a folder is not specified, then messages in all message client folders, in all stores, and/or PSTs will be included. The user can specify multiple folders to include by separating the folder names with semicolons (and no additional spaces). For example, to include the folders "Inbox" and "My Stuff" (and all of their subfolders), specify: Inbox;My Stuff.

To specify how to sort the list via the Sort By section 430, the user can select from the following: alphabetically or by the earliest or latest message of the displayed messages. These can be sorted in either ascending or descending order via the "Highest to lowest" checkbox on the right.

Alternatively, the list can be sorted on social information, using two queries which can be combined with an operator. The operator can be Plus, Minus, Multiply or Divide. The operator can be switched by clicking on the box to the right of the query boxes. To sort by the social information, ensure that the radio button next to the boxes is selected.

For example, to view the unread message in the Inbox, sorted by how often the user has replied to the sender (useful to find the messages in the Inbox that most likely need a reply):

Display: Unread Messages From Them (Select: To anyone, All, and Unread only)
Only in folders: Inbox
Sort By: Replies From Me, To or CC Them (Select: From Me, All, and Replies only)
Highest to lowest: Checked (to show those replied to the most at the top of the list).

To see messages from people who send more mail to the current user than they have sent back in the last year (useful for to find people with unsymmetrical message patterns):

Display: Messages From Them, To or CC Me, in the last 365 days (Select: To or CC Me, 365 days)
Sort By, first box: Messages From Them, To or CC Me, in the last 365 days (Select: To or CC Me, 365 days)
Sort By, operator: /(click on the box until the divide operator appears)
Sort By, second box: Messages From Me, To or CC Them, in the last 365 days (Select: From Me, 365 days)
Highest to lowest: Checked (to show those with more received message at the top of the list).

To see unread messages in the last month sorted by people that have been sent to the least (useful for Technical Support or Sales):

Display: Unread Messages From Them, in the last 30 days (Select: To anyone, 30 days, Unread only)
Sort By: Messages To or CC Them (Select: From anyone, All)
Highest to lowest: Unchecked (to show those with the fewest messages to them at the top).

Figure 5:
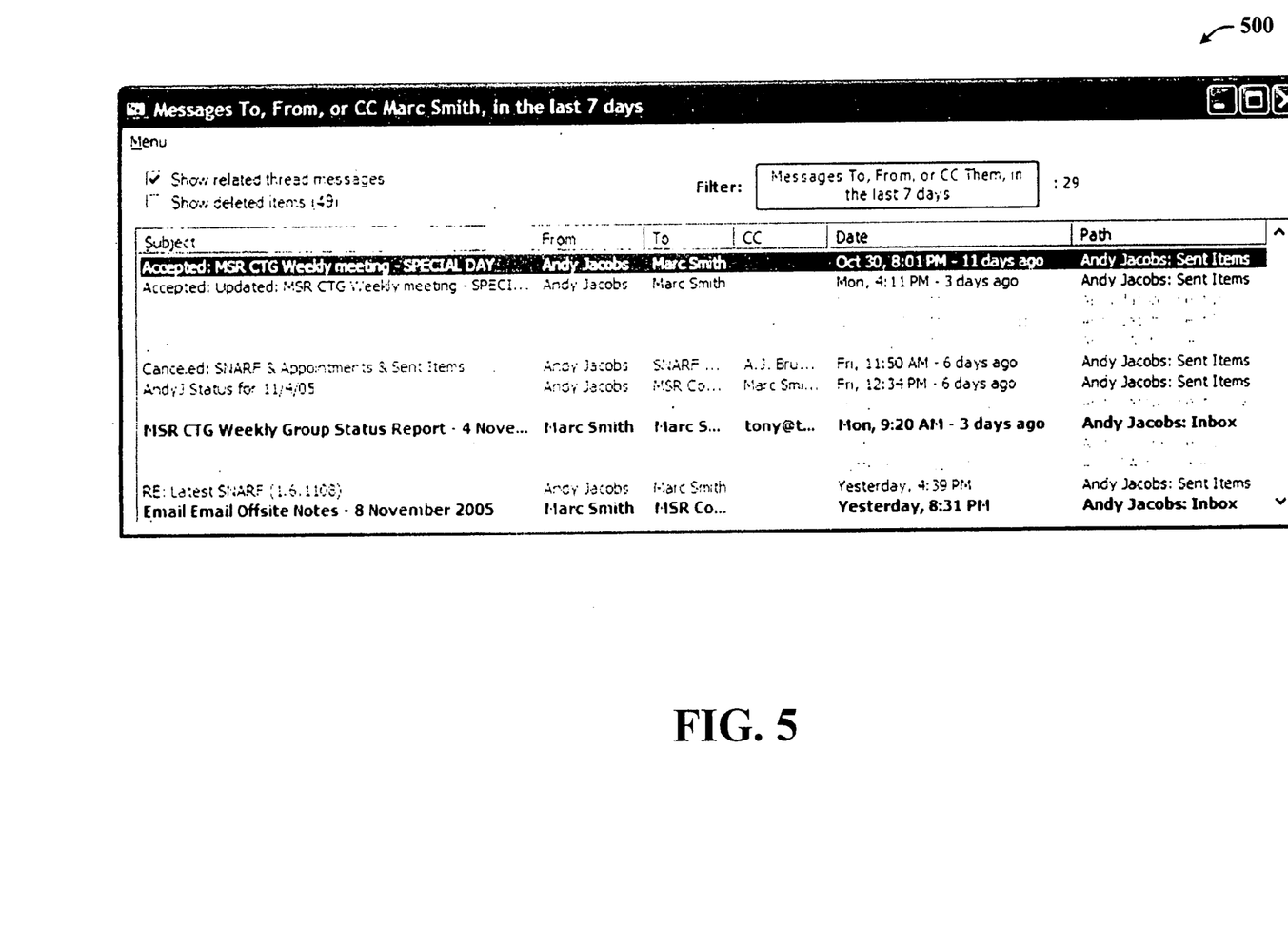
FIG. 5 is an exemplary user interface of a list view screen that facilitates viewing messages pertaining to a particular correspondent.

Messages from a particular correspondent can be displayed in a list view screen 500 as shown in FIG. 5. In particular, the list view can show the messages associated with a person from a specific pane view. The list of messages can be refreshed for recent messages and any other changes. As shown, each message is represented in this window as a single row with various columns of data. The list can be sorted by any of the columns by clicking on the column header (and click again to reverse the sort). The column headers can also be resized by dragging the column separators in the header area. If the text from one cell is too long to be displayed, it is shown with ellipsis, and the full text will appear if the mouse hovers over the cell. All unread messages can be presented in bold.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 6:
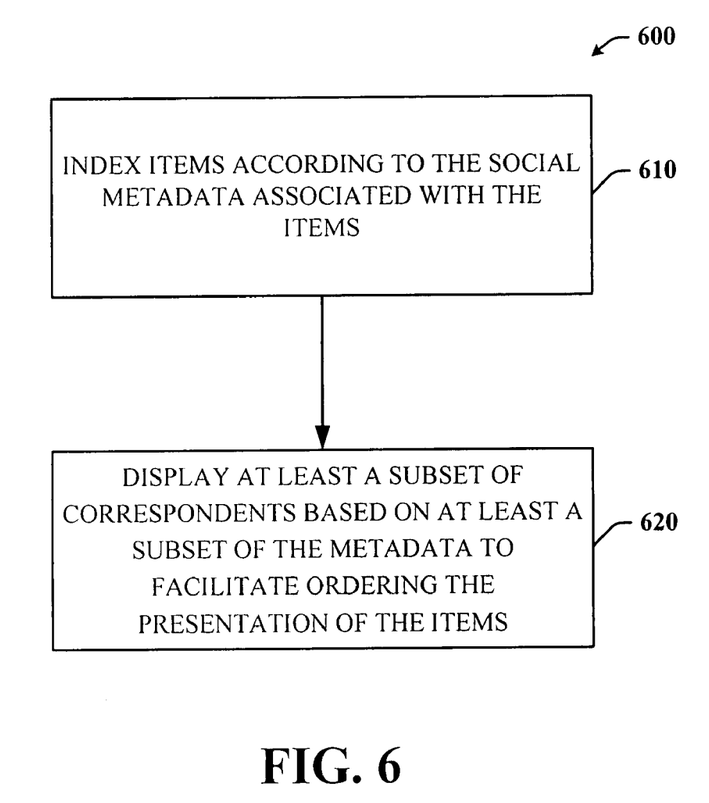
FIG. 6 is a flow diagram illustrating an exemplary methodology that facilitates ordering personal items based in part on social metadata.

FIG. 6 is a flow diagram illustrating an exemplary method 600 that facilitates ordering personal information or items based in part on social metadata. The method 600 involves indexing items from or to one or more correspondents according to the social metadata associated with the items at 610. At 620, at least a subset of correspondents can be displayed in an order that is based at least in part on at least a subset of the social metadata which facilitates ordering the presentation of the items. The method 600 can operate cooperatively with a messaging client. As messages are received by the client, the method 600 can index them according to the social metadata associated with each of them. For example, the social metadata can include any properties associated with the correspondents and their messages sent to or from a current user such as the recipients on the To or CC line, sender, date, whether a reply was received or sent, etc. The method can index for each of the user's correspondents: the number of times a correspondent sent a message to the user or the number of times a correspondent received a message from the user. Other measurements can be calculated as well based on the metadata. The user can choose to display her correspondents and any pertinent messages (read, unread or both) according to a history of prior communications between the user and the correspondent. Hence, correspondents who have received the most replies from the user may appear at or near the top of the list when the user considers this type of relationship to be relatively important to her.

Figure 7:
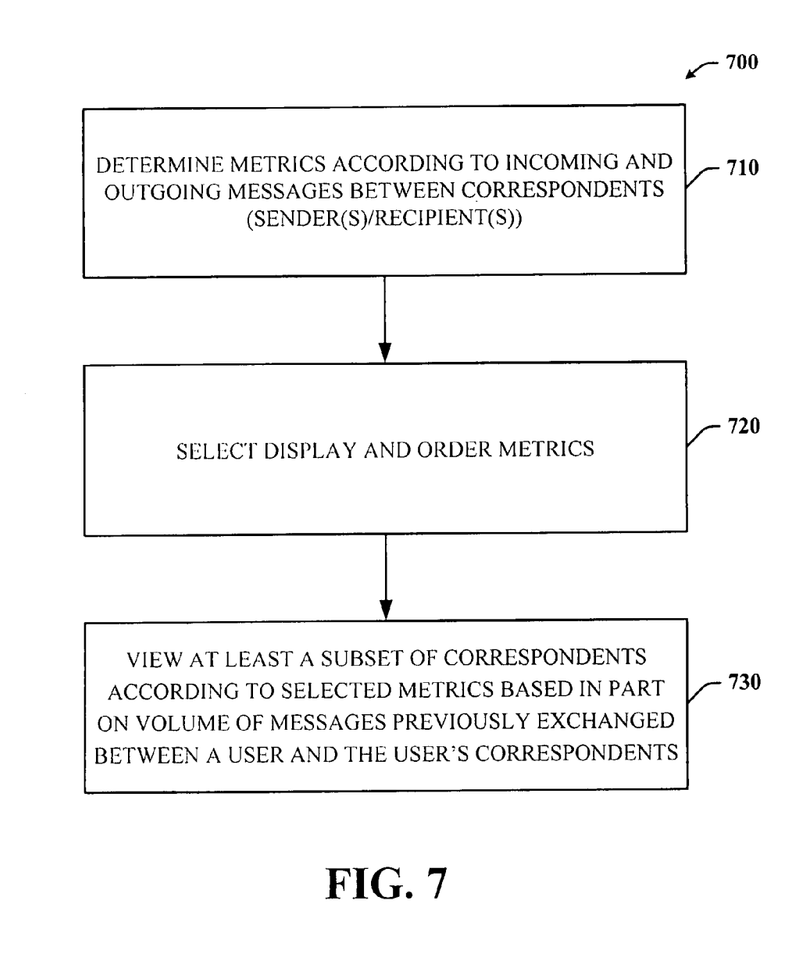
FIG. 7 is a flow diagram illustrating an exemplary methodology that facilitates ordering messages based in part on a history of communication between correspondents.

Referring now to FIG. 7, there is a flow diagram illustrating an exemplary method 700 that facilitates ordering messages based in part on a history of communication between correspondents. The method 700 involves determining one or more metrics according to incoming and outgoing messages between correspondents at 710. At 720, one or more metrics can be selected in order to configure the information that is presented. At 730, at least a subset of the user's correspondents can be viewed according to the selected metrics—which may be based in part on the volume of messages previously exchanged between the user and her correspondents. In practice for example, a user may wish to choose to display unread messages from them sent only to the user, however he wants to sort the list of correspondents according to the number of replies the user has sent to them in the last 30 days. Mailings lists have sent the most messages to the user. However, according to these selected display and sort metrics, the pane view shows mailing lists at the bottom of the list rather than at the top since the user has not sent replies to the lists' messages.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates ordering a user's information based on past personal interactions of the user comprising:
a processor component that includes a metric aggregator that determines and aggregates one or more social metrics derived from at least a subset of social metadata associated with the information; and
a display component that presents at least one view of at least a subset of the information in an order based on at least one social metric;
wherein the social metric is a quantifiable relationship between the user and at least one correspondent of the user based on a history of communication between the user and the at least one correspondent of the user, and wherein the one or more social metrics comprise the following attributes:
a number of messages sent to each correspondent from the user;
a number of replies to each correspondent from the user;
a number of messages sent to each correspondent from other correspondents and not the user;
a number of messages sent to the user from each correspondent;
a number of replies sent to the user;
a number of messages marked read;
a number of messages marked unread; and
a number of messages courtesy copied to the user.

2. The system of claim 1, the metric aggregator calculates social metric values that reflect relationships of the user with respect to the information.

3. The system of claim 1, wherein the information comprises messages and the social metadata comprises sender and recipient data.

4. The system of claim 3 operates in tandem with a messaging client in order to facilitate triaging incoming messages and providing notifications of messages from selected senders, wherein a change in a message state in the messaging client is also reflected in the system.

5. The system of claim 1, wherein the one or more metrics are selectively applied across one or more folders maintained by the messaging client.

6. The system of claim 3, wherein the one or more metrics are applied within to a selected time period.

7. The system of claim 3 further comprises an enumerator that calculates the one or more metrics according to existing, incoming, and outgoing messages.

8. The system of claim 1 further comprises a customization component that personalizes the one or more metrics selected to order the information.

9. One or more computer-readable storage media that implement computer-readable instructions using a processor to implement a method that facilitates ordering personal items based on past personal interactions of a user comprising:
indexing items according to social metadata associated with the items;
determining one or more social metrics based on at least a subset of the social metadata, wherein the social metrics are a quantifiable relationship based on a history of communication between a user and a correspondent of the user; and
displaying at least a subset of the items by the correspondents identified therein based on at least a subset of the metadata, thereby facilitating presenting the items in an order according to past interactions between the user and the user's correspondents,
wherein determining the one or more social metrics comprises analyzing messages communicated between the user and any correspondents to ascertain a plurality of attributes relating to any previous interactions with the user, and
wherein the one or more social metrics include the following attributes:
a number of messages sent to each correspondent from the user;
a number of replies to each correspondent from the user;
a number of messages sent to each correspondent from other correspondents and not the user;
a number of messages sent to the user from each correspondent;
a number of replies sent to the user;
a number of messages marked read;
a number of messages marked unread; and
a number of messages courtesy copied to the user.

10. The computer-readable media method of claim 9, wherein the items comprise messages.

11. The computer-readable media of claim 10 further comprises displaying a plurality of messages in a list view when the plurality of messages is associated with the same correspondent.

12. The computer-readable media of claim 9, wherein the items are displayed in at least one view comprising one or more pane views, a list view, and a thread view.

13. The computer-readable media method of claim 12 further comprises customizing the pane view to personalize one or more metrics selected to order the items on display in that pane.

14. One or more computer-readable storage media that implement computer-readable instructions using a processor to implement a method comprising:
determining a plurality of social metrics, the social metric is a quantifiable relationship between a user and at least one correspondent that is based on a history of communication between a user and the at least one correspondent;
organizing communications of the user when the user selects a priority based on at least one social metric; and
wherein the social metrics include:
an amount of communications each correspondent receives from the user;
an amount of reply communications each correspondent receives from the user;
an amount of instances in which each correspondent is included in communications sent by the user;
an amount of instances in which each correspondent is included in communications that include the user;
an amount of communications the user receives from each correspondent;
an amount of reply communications the user receives from each correspondent;
an amount of communications the user receives from each correspondent that are read by the user;
an amount of communications the user receives from each correspondent that are waiting to be read by the user;
an amount of instances in which each correspondent includes the user in communications;
an amount of instances in which each correspondent includes the user in a communication that the user has read; and
an amount of instances in which each correspondent includes the user in a communication that is waiting to be read by the user.

* * * * *

UNITED STATES PATENT AND TRADEMARK OFFICE
CERTIFICATE OF CORRECTION

PATENT NO.        : 7,720,916 B2                        Page 1 of 1
APPLICATION NO.   : 11/363885
DATED             : May 18, 2010
INVENTOR(S)       : Danyel A. Fisher et al.

It is certified that error appears in the above-identified patent and that said Letters Patent is hereby corrected as shown below:

In column 5, line 29, after "All" insert -- of --.

In column 14, line 10, in Claim 10, after "media" delete "method".

In column 14, line 19, in Claim 13, after "media" delete "method".

Signed and Sealed this
Seventeenth Day of May, 2011

David J. Kappos
*Director of the United States Patent and Trademark Office*